United States Patent [19]

Kojima et al.

[11] 3,857,820

[45] Dec. 31, 1974

[54] SOLUTION FOR FORMING THERMALLY RESISTANT POLYMERS

[75] Inventors: Makoto Kojima; Yuzuru Noda; Shiro Mazaki; Yashutada Katashiba, all of Osaka, Japan

[73] Assignee: Nitto Electric Industrial Co., Ltd., Osaka, Japan

[22] Filed: Sept. 13, 1973

[21] Appl. No.: 397,209

[30] Foreign Application Priority Data

Sept. 14, 1972 Japan.................................... 92564

[52] U.S. Cl. ........ 260/77.5 AM, 117/124, 117/126, 117/128.4, 156/331
[51] Int. Cl............................................. C08g 22/00
[58] Field of Search ............. 260/77.5 AM, 77.5 R, 260/77.5 CA, 77.5 TB

[56] References Cited
UNITED STATES PATENTS

| | | | |
|---|---|---|---|
| 3,594,351 | 7/1971 | Uchida et al................ | 260/77.5 CA |
| 3,725,353 | 4/1973 | Fujimoto et al............. | 260/77.5 CA |
| 3,761,451 | 9/1973 | Fujimoto et al............. | 260/77.5 CA |

Primary Examiner—M. J. Welsh
Attorney, Agent, or Firm—Sughrue, Rothwell, Mion, Zinn & Macpeak

[57] ABSTRACT

A highly concentrated and low-viscous solution in an inexpensive solvent for forming improved thermally resistant polymers is composed of a mixture as a solution of a prepolymer terminally substituted with glycine derivatives and a blocked polyisocyanate compound, said prepolymer solution having been prepared by reacting a diglycine derivative and a diisocyanate or a blocked diisocyanate each having an imide group and, as the case may be, an imide-forming group in the molecular chain and which is prepared by the reaction of 1,2,3,4-butanetetracarboxylic acid or a derivative thereof and a diisocyanate monomer.

12 Claims, No Drawings

SOLUTION FOR FORMING THERMALLY RESISTANT POLYMERS

BACKGROUND OF THE INVENTION

1. Field of the Invention

The present invention relates to a solution for forming thermally resistant polymers and, more particularly, the invention relates to a concentrated solution suitable for forming by heat-treatment, a highly polymerized thermally resistant polymer containing an imide group, a hydantoin ring, or an amide group in the chain of the polymer molecule. Furthermore, the invention relates also to a process of preparing the aforesaid concentrated solution.

2. Description of the Prior Art

It is known that polyimides, polyamideimides, polyimidazoles, and copolymers thereof exhibit high thermal resistance, good chemical resistance and other excellent properties, and that they are very useful for wire coatings, films, laminates, coating materials, adhesives, varnishes for impregnation and the like, particularly when they are used under high temperature conditions.

Those thermally resistant polymers are generally prepared in the following manner: That is, starting materials (for example, a tetracarboxylic acid dianhydride and a diamine in case of preparing polyimide) are reacted in a basic solvent such as N-methyl-2-pyrrolidone, N,N-dimethylformamide, N,N-dimethylacetamide, etc., to prepare a polymer or a polymer precursor having a sufficiently high molecular weight and then the final desired product, the thermally resistant polymer, is produced by processing, e.g., heat-treating the above polymer or polymer precursor.

Since the thermally resistant polymer thus prepared is generally an infusible or insoluble material, the ability to process the polymer or fabricate the polymer into useful articles is poor. Accordingly, the processing or fabrication is ordinarily conducted on the polymer or polymer precursor having a sufficiently high molecular weight as a solution and, in this case, for workability and from the standpoint of economics it is desired that the solution of the polymer or polymer precursor be highly concentrated and have a low viscosity. However, in order to obtain the final polymer having good properties once processed or fabricated, the polymer precursor is required to have a sufficiently high molecular weight. On the other hand, the basic solvent used for preparing the above described polymer precursor is expensive and is highly hygroscopic. Thus, the polymer precursor solution becomes inevitably expensive and there are some difficulties about the stability of the solution.

Therefore, in spite of its excellent properties, the conventional thermally resistant polymers are, at present, used for only specific purposes.

The inventors have done research and have discovered a solution for forming a thermally resistant polymer, which has excellent working properties and which is economical yet which is unaccompanied by the aforesaid disadvantages and difficulties. It has been discovered that a highly concentrated, low viscosity solution for forming thermally resistant polymers can be obtained without using expensive basic solvents or at least with an extremely reduced amount of such expensive basic solvents.

SUMMARY OF THIS INVENTION

That is, the present invention provides a solution, in particular, a concentrated solution for forming thermally resistant polymers comprising a mixture of a solution of a prepolymer terminally substituted with glycine derivatives and a blocked polyisocyanate compound in an amount which is approximately stoichiometrically equivalent to the amount of the prepolymer, the prepolymer having been prepared by reacting about 2 equivalents of a diglycine derivative and the isocyanate group of a diisocyanate or a blocked diisocyanate each containing an imide group and, as the case may be, an imide forming group in the chain of the molecule and which is prepared by the reaction of 1,2,3,4-butanetetracarboxylic acid and/or a derivative thereof with an excess on a molar basis of a diisocyanate monomer.

DETAILED DESCRIPTION OF THE INVENTION

The above described concentrated solution thus prepared can be converted into a final polymer having sufficient toughness and high thermal resistance by, after applying proper fabrication or processing operations according to the desired end uses, heating, whereby a ring closing polycondensation occurs while evaporating off the solvent.

The solution of the prepolymer terminally substituted with glycine derivatives used in this invention is prepared by reacting about 2 equivalent amounts of a diglycine derivative with the isocyanate group of a diisocyanate or a blocked diisocyanate each containing an imide group and, as the case may be, an imide-forming group, the diisocyanate or blocked diisocyanate having been prepared by reacting 1,2,3,4-butanetetracarboxylic acid and/or a derivative thereof and an excess on a molar basis of a diisocyanate monomer in an organic solvent such as phenol, cresol, xylenol, and commercially available mixtures thereof or, as the case may be, in a basic solvent such as N-methyl-2-pyrrolidone, N,N-dimethylacetamide, N,N-dimethylformamide, etc. However, since the reaction of the isocyanate group and the diglycine derivative must be conducted in an acidic organic solvent, the solvent for the reaction must be at least such that the proportion of the acidic organic solvent is essentially larger than the basic solvent.

It is preferred to use the acidic organic solvent alone, but when a basic solvent is used together with the acidic organic solvent, an additional amount of the acidic organic solvent, i.e., approximately twice the volume of the basic solvent used, can be added to a reaction system in the subsequent reaction.

The aforesaid solvent can further be used as a mixture with an inert organic solvent such as toluene, xylene, solvent naphtha, and the like. The proportions of the above solvent (or the solvent mixture) and the additional inert solvent can be varied widely depending upon the type of the reaction system used for the preparation of prepolymers. Generally, the inert solvent can be used in such an amount that the solubility of the prepolymer in the resulting solvent system is not lowered.

The 1,2,3,4-butanetetracarboxylic acid used in this invention is, as will be explained hereinafter, effective for forming an imide group by easily reacting with the diisocyanate monomer. Also derivatives of this tetracarboxylic acid such as 1,2,3,4-butanetetracarboxylic acid monoanhydride, 1,2,3,4-butanetetracarboxylic acid dianhydride, 1,2,3,4-butanetetracarboxylic acid diester, 1,2,3,4-butanetetracarboxylic acid diamide, etc., can be used to form the imide group. The 1,2,3,4-butanetetracarboxylic acids can be used individually or as a mixture thereof.

As the diisocyanate monomer used in this invention, diisocyanate monomers having the general formula $$OCN-R'-NCO$$

wherein R' represents an aromatic, alicyclic or aliphatic divalent organic radical can be employed. An aromatic diisocyanate is preferred but an aliphatic diisocyanate monomer, an alicyclic diisocyanate monomer or dithioisocyanate can also be used and further a blocked monomer prepared by blocking the isocyanate group of each of the above described diisocyanates with phenol, cresol, etc., using known techniques can be used. Such blocked monomers can be represented by the general formula $$R''OOCHN-R'-NHCOOR''$$

wherein R' is as above described and R'' represents an aromatic monovalent radical, an aliphatic monovalent radical or an alicyclic monovalent radical.

Examples of the above described diisocyanate monomers include p-phenylenediisocyanate, m-phenylenediisocyanate, 4,4'-diphenyletherdiisocyanate, 4,4'-diphenylmethanediisocyanate, 1,5-naphthylenediisocyanate, cyclohexane-1,4-diisocyanate, hexamethylenediisocyanate, etc., and examples of the blocked monomers include bis(phenoxycarbamyl)-4,4'-diphenylmethane, bis(phenoxycarbamyl)-4,4'-diphenyl ether, bis(phenoxycarbamyl)-1,3-benzene, bis(phenoxycarbamyl)-2,4-toluene, bis(ethoxycarbamyl)-4,4'-diphenyl ether and the like.

The diglycine derivative used in this invention can be one represented by the general formula $$[R_1OOC(R_2)_2CHN]_2R_3$$

wherein $R_1$ and $R_2$, which may be the same or different, each represents a hydrogen atom or a lower alkyl radical (e.g., having one to about four carbon atoms) and $R_3$ represents a divalent organic radical.

The diglycine derivative of the above general formula in which $R_3$ is an aromatic radical is preferred but derivatives in which $R_3$ is an aliphatic radical or an alicyclic radical can also be used in this invention. Suitable examples of divalent aromatic, aliphatic and alicyclic organic radicals for $R_3$ are

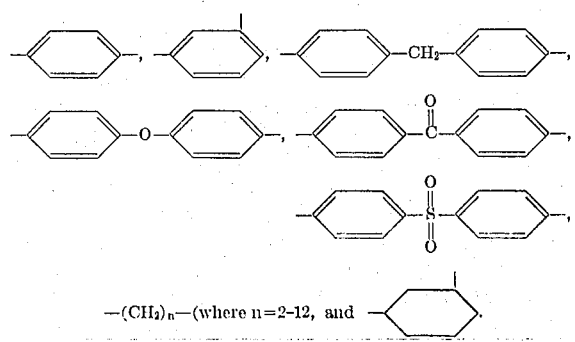

Examples of the glycine derivatives used in this invention are p-phenylenebis(iminoacetic acid), m-phenylenebis(iminoacetic acid), 4,4'-diphenylbis-(iminoacetic acid), 4,4'-diphenyletherbis-(iminoacetic acid), 4,4'-diphenylmethanebis(iminoacetic acid), 4,4'-benzophenonebis(iminoacetic acid), 4,4'-diphenylsulfonebis-(iminoacetic acid), hexamethylenebis(iminoacetic acid), 1,3-cyclohexanebis-(iminoacetic acid), the lower alkyl ester ($C_1$-$C_4$) thereof or the isomers thereof, i.e., those having the same substituents but with the substitutents being substituted in different positions, e.g., 4,4'-diphenylbis-(iminoacetic acid) and 3,4'-diphenylbis(iminoacetic acid).

If the amount of the diisocyanate monomer is assumed to be $a$ moles, the amount of the 1,2,3,4-butanetetracarboxylic acid and/or the derivative thereof to be $b$ moles, and further the amount of the diglycine derivative to be $c$ moles, the ratio of the amounts thereof added satisfies the condition of $a > b$, preferably $b/a = 0.5$ to $0.95$ and further preferably the condition of $c \approx 2(a - b)$.

Furthermore, the above described starting materials are supplied as solutions thereof at a concentration of about 20 to 90%, preferably about 40 to 60% by weight. The reaction temperature depends upon the nature of the solvent used but the reaction temperature is generally in the range of from about 0°C to 200°C.

An embodiment of preparing the prepolymer terminally substituted with glycine derivative groups by the reaction of the diisocyanate monomer, the 1,2,3,4-butanetetracarboxylic acid (hereinafter, designated "BTC" for brevity) and/or the derivative thereof, and the diglycine derivative is explained below in greater detail:

First of all, an excess molar amount of the diisocyanate monomer is dissolved in cresol and after raising the temperature of the solution to 150° to 170°C in situ and maintaining the solution at this temperature to block the diisocyanate with cresol, BTC is added to the solution, thereafter, carbon dioxide is evolved and additionally water is formed. Usually, the imide group containing diisocyanate can be obtained by conducting the reaction for about 3 hours at 150° to 165°C. In this case, if the reaction temperature is lower than the above described range, the period of time for completing the reaction is too long and further using cresol if the reaction temperature is lower than 140°C, the reaction does not proceed. On the other hand, if the reaction temperature is higher than the above described range, the reaction occurs vigorously so that control of the reaction difficult, and as the case may be, the reaction system gels. Completion of the reaction can be determined by measuring the amount of isocyanate groups present or by measuring the viscosity of the reaction system, and comparing the viscosity with a sample or set of samples in which the extent of the reaction is known.

Then, to the imide group containing diisocyanate prepolymer thus obtained is added the diglycine derivative in an amount of about 2 equivalents to the amount of isocyanate. By reacting both reactants for 0.5 to 2 hours at 150° to 170°C, the desired solution of the prepolymer terminally substituted with glycine derivatives can be obtained.

In the above described example, the diisocyanate is first dissolved in cresol and after raising the temperature of the solution to form the cresol-blocked monomer, the BTC is added to the solution but the BTC can be dissolved in the cresol before adding the diisocyanate monomer or the diisocyanate monomer and the BTC can be added to the cresol simultaneously. Moreover, even if the diisocyanate monomer reacts with the BTC without forming the blocked monomer thereof in a cresylic solvent, the same product can be produced as in the case of forming the blocked monomer but in this case the reaction system sometimes becomes temporarily cloudy and thus this procedure is not preferred, as a reaction method for forming the blocked diisocyanate prepolymer.

Also, the reaction temperature depends upon the kind of solvent employed but since the reaction is accompanied by a dehydration reaction, the solvent should be selected so that the reaction can be conducted at temperatures at which water can be easily distilled away. For example, in using a basic solvent, N-methyl-2-pyrrolidone, it is difficult to distil away the water formed by increasing the temperature of the reaction system since in such case the reaction occurs too easily and the isocyanate group reacts with the N-methyl-2-pyrrolidone at an elevated temperature. Also, since the subsequent reaction of the imide group containing diisocyanate prepolymer and the diglycine derivative proceeds in an acidic solvent, it is preferable to conduct the above described reaction in cresol as illustrated in the above embodiment.

It is believed that in the reaction of the diisocyanate monomer and the BTC, the isocyanate group reacts with the carboxyl group to form an amide-acid while generating carbon dioxide and then an imidation reaction occurs easily by dehydration. It is well known that an isocyanate group is quite an active functional group and in general reacts with compounds having active hydrogen atoms to form various kinds of compounds. Thus, there is concern with various side reaction in the reaction caused by the reaction of the isocyanate group and water but it is astonishing that in the reaction of this invention, in spite of the occurence of the dehydration reaction, the isocyanate group acts actively without being attacked by the water formed and the imide group containing diisocyanate prepolymer is obtained.

Then, as the blocked polyisocyanate compound mixed with the solution of the prepolymer having the terminal glycine derivatives as described above for producing the solution of this invention, blocked compounds prepared by the reaction of a polyisocyanate and compounds represented by the formula

ROH wherein R represents an aromatic mono-valent radical, an aliphatic mono-valent radical or an alicyclic mono-valent radical are used. Suitable examples of the compound ROH are phenol, cresol, xylenol, methanol, ethanol, cyclohexanol, etc.

As such a blocked compound, the blocked compound of the above described imide group containing diisocyanate prepolymer as well as of a polyisocyanate containing at least one of an imide group, a hydantoin ring, and an amide group in the chain of the molecule as will be described hereinafter give particularly preferred results for obtaining the concentrated solution for providing polymers having excellent thermal resistance, mechanical properties, and electric properties. However, the blocked compounds of such diisocyanates or dithiosocyanates as p-phenylene diisocyanate, 2,4-tolylenediisocyanate, 1,5-naphthylenediisocyanate, 4,4'-diphenylmethanediisocyanate, 4,4'-diphenylether diisocyanate, hexamethylenediisocyanate, cyclohexane-1,4-diisocyanate, p-phenylenedithioisocyanate, 4,-4'-diphenylmethanedithioisocyanate, etc., and also the blocked compounds of polyisocyanates having a comparatively low molecular weight such as those commercially available under the trade names of "Desmodur AP-Stable," "Desmodur CT-Stable," etc., produced by Farbenfabriken Bayer Aktiengesellshaft, Germany, can be used similarly in this invention.

In addition, as the compounds of the formula ROH shown above, there are phenol, cresols, xylenols, and alcohols as described previously.

Furthermore, as the blocked compounds of polyisocyanate containing at least one of an imide group, a hydantoin ring, and an amide group in the chain of the molecule as described above, the following compounds are illustrated:

A. A blocked compound of the imide group containing diisocyanate which is a precursor of the above described prepolymer terminally substituted with glycine derivatives. That is, a blocked compound of an imide group containing diisocyanate prepared by reacting under heating at a temperature of about 0° to 200°C, an excess molar amount using conditions described previously of the diisocyanate monomer and BTC, e.g., in a molar ratio of 0.5:1 to 0.95:1 of BTC to diisocyanate monomer in a solvent such as phenol, cresol, xylenol or a mixture thereof.

The concentrated solution of this invention prepared by mixing the blocked compound of the imide group containing diisocyanate thus prepared and the above described solution of the prepolymer terminally substituted with glycine derivative groups is effective, for use as a varnish for enameled electric wires, for providing thermally resistant wires having excellent Freon resistance.

B. A blocked compound of an amide-imide group containing diisocyanate terminally substituted with isocyanate groups prepared by reacting a tribasic organic acid anhydride represented by the general formula

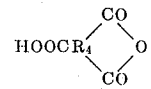

wherein $R_4$ represents a trivalent organic radical, for example, $R_4$ represents

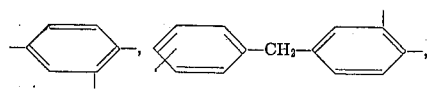

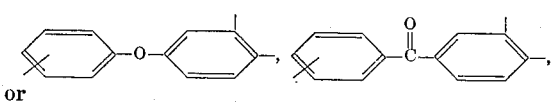

or

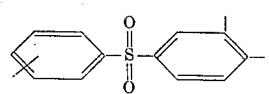

and an excess molar amount of a diisocyanate monomer.

Examples of tribasic organic acid anhydrides represented by the above general formula are trimellitic acid anhydride, 4-carboxydiphenylmethane-3',4'-dicarboxylic acid anhydride, 3- carboxydiphenylmethane-3',4'-dicarboxylic acid anhydride, 4-carboxydiphenylether-3',4'-dicarboxylic acid anhydride, 3-carboxydiphenylether-3',4'-dicarboxylic acid anhydride, 4-carboxydiphenylketone-3',4'-dicarboxylic acid anhydride, etc. They can be used individually or as mixtures thereof. Furthermore, part of the above described tribasic organic acid anhydride can be substituted for by an dibasic organic acid such as terephthalic acid, isophthalic acid, etc., and in this case, the dibasic organic acid acts as an effective component for forming an amide group.

The amount of the diisocyanate monomer added in the above reaction is from about 1.1 to 4.0 moles, preferably about 1.2 to 2.0 moles per mole of the tribasic organic acid anhydride and by reacting them in an organic polar solvent at temperatures of about 50° to 210°C, preferably about 30° to 130°C, an amide-imide group containing diisocyanate is produced.

The concentrations of the starting materials as described above used in this invention are preferably as high as possible and it is desirable that the reaction be conducted at a concentration of about 50 to 90% by weight.

The reaction proceeds gradually while generating carbon dioxide and as the reaction progresses, the color of the reaction system becomes black-brown. The completion of the reaction can be determined by measuring the isocyanate groups using the di-N-butylamine method. When the isocyanate content reaches a theoretical amount, the product is blocked with phenol, cresol, xylenol, or an alcohol in a known manner to provide the blocked compound of the amide-imide group containing diisocyanate.

The concentrated solution of this invention prepared by mixing the blocked compound produced above and the above described solution of the prepolymer terminally substituted with glycine derivatives is effective, when used as a varnish for enameled electric wires, for providing thermally resistant wires having high abrasion resistance and Freon resistance.

C. A blocked compound of a diisocyanate containing a hydantoin ring, of which a part may be hydantoic acid or a lower alkyl (e.g., $C_1$–$C_4$) ester thereof, in the molecular chain and also containing isocyanate groups at the terminals of the molecule prepared by reacting the above described diglycine derivative represented by the formula

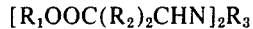

$$[R_1OOC(R_2)_2CHN]_2R_3$$

wherein $R_1$ and $R_2$, which may be the same or difference, each represents a hydrogen atom or a lower alkyl radical (e.g., $C_1$–$C_4$) and $R_3$ represents a divalent organic radical, as hereinbefore described and an excess molar amount of the diisocyanate monomer.

The amount of the diisocyanate monomer added in the above reaction is from about 1.1 to 4.0 moles, preferably from about 1.2 to 2.0 moles per mole of the above described diglycine derivative and by reacting both reactants in an acidic solvent such as cresol, xylenol, etc., for about 3 to 5 hours at temperatures of about 30° to 210°C, the blocked compound of the diisocyanate containing a hydantoin ring and, as the case may be, a functional group having the ability to form a hydantoin ring in the molecular chain and terminally substituted with isocyanate groups is obtained.

The concentrations of the starting materials reacted are preferably as high as possible, preferably about 50 to 90% by weight.

When, after conducting the reaction for about 20 to 60 minutes at about 30° to 60°C, the temperature of the reaction system is increased gradually, the reaction proceeds at about 120°C accompanied by distillation of water when the iminoacetic acid is employed and of alcohol when the iminoacetic acid alkyl ester is employed. As the reaction progresses, the color of the reaction system becomes black-brown. When the reaction temperature is further increased and the reaction is conducted for about 3 to 4 hours at about 190° to 210°C, the blocked compound of the hydatoin ring containing diisocyanate having a theoretical amount of isocyanate is obtained.

The concentrated solution prepared by mixing the blocked compound thus prepared with the above described solution of the prepolymer terminally substituted with glycine derivatives is effective, when used as a varnish for enameled electric wires, for providing thermally resistant wires having excellent flexibility and abrasion resistance.

In the above description, various kinds of blocked compounds of polyisocyanate and methods of producing the compounds were described. The concentrated solution of this invention can be obtained by mixing the above described prepolymer having terminal glycine derivatives, whose molecular weight generally ranges from about 500 to about 15,000, with each of the blocked polyisocyanate compounds in which the mixing ratio of the prepolymer and blocked compound is preferably approximately stoichiometrically equivalent, but up to a 20% excess or less than equivalent amounts can be employed, and by heating the concentrated solution, a high molecular weight thermally resistant polymer having excellent electrical, mechanical and chemical properties can be obtained.

Furthermore, because the terminal glycine derivative substituted prepolymer contained in the concentrated solution of this invention has a comparatively small molecular weight and has good solubility and also the blocked polyisocyanate compound in the solution has also similar properties, the viscosity of the solution is greatly reduced.

Therefore, the solution of this invention for forming thermally resistant polymers has the important advantage that it can be used in a quite high concentration.

For example, when the solution is used as a varnish for enameled electric wires, the solution can be used at a concentration of from 20 to 50% by weight and at a viscosity of from about 200 to 10,000 cp. (30°C), preferably about 500 to 6,000 cp. (30°C), and if desired, the concentrated solution of this invention having a viscosity of lower than 100 cp. can be easily obtained. Also, in case of forming films, the concentrated solution can be used at a concentration of from 30 to 60% by weight and a viscosity of from about 30,000 to 150,000 cp. (30°C), preferably about 50,000 to 120,000 cp. As can be readily understood, the solution of this invention can be used practically at a high concentration and at a comparatively low viscosity and thus the solution is quite profitable from the standpoint of workability and economics. For preparing thermally resistant polymers from the concentrated solution of this invention, it is necessary to polymerize the materials in the solution and remove the solvent by heating.

It is further preferred to incorporate in the solution of this invention a polymerization promotor and examples of such polymerization promotors are organometalic salts such as lead octylate, iron octylate, zinc octylate, lead naphthenate, iron naphthenate, zinc naphthenate, calcium naphthenate, dibutyltin dilaurate, zirconium acetyl acetonate, aluminum acetyl acetonate, iron acetyl acetonate, etc., and tertiary amines such as dimethylbenzylamine, pyridine, triethylenediamine, etc. Such a promotor is generally used in an amount of 0.01 to 5% by weight based on the resin content of the composition.

It is better to conduct the post hardening after removal of solvent at temperatures of from about 150° to 500°C for obtaining final films or coatings.

The concentrated solution of this invention has also the advantage that it can be stored for a quite long period of time without any deterioration occurring.

Also, the solution of this invention can be used, in addition to the formation of coatings, as varnishes for impregnation, for laminates adhesives, etc., by appropriately controlling the viscosity and the concentration thereof according to the desired end purpose.

The prepolymer terminally substituted with glycine derivatives for preparing the solution of this invention for forming thermally resistant polymers can be produced by the methods as illustrated in greater detail Examples A to C and the blocked compounds of polyisocyanate are produced not only as the blocked compounds of the imide group containing diisocyanates which are the precursors at the production of the prepolymers terminally substituted with glycine derivatives in the Examples A to C but also by the methods as illustrated in Examples D and E.

In the following Examples, unless otherwise indicated all parts and percents are by weight.

EXAMPLE A

In a 1,000 ml three-necked flask equipped with a thermometer, a condenser with a trap, and a stirrer were placed 150.1 g (0.6 mole) of 4,4'-diphenylmethanediisocyanate and 487.3 g of commercially available cresol and then the mixture was heated at a temperature of 30° to 40°C to dissolve the diisocyanate. The temperature of the solution was increased gradually and after stirring the solution for about 1 hour at 160°C to form a blocked monomer and then adding 112.3 g (0.48 mole) of BTC, the reaction was conducted at 155° to 160°C. After the addition of the BTC, water began to be distilled off and the reaction system became uniformly dark brown. The reaction was further conducted for about 5 hours at the same temperature. In this case, however, the formation of water essentially stopped after 3 hours. The completion of the reaction was at the point at which the viscosity of the reaction system became 37 poises (30°C) as measured using a Brookfield viscometer. By the measurement of the isocyanate group content according to an amine method, the remaining isocyanate equivalent was approximately the theoretical value and it was confirmed that the product contained 0.0352 equivalents of isocyanate group per 100 g of the solution (theoretical value 0.0349 equivalents).

In the amine method, a 2N di-n-butylamine solution in toluene is prepared. Into the above solution which is further diluted with toluene is placed a glass ball containing a given amount of isocyanate to be determined, and the mixture is boiled for about one hour. After allowing to cool, methanol and subsequently a small amount of bromophenol blue is added to the resulting solution, and the mixture is titrated with a ½ — 1N hydrochloric acid to a point at which the color changes from blue to yellow. A blank test is conducted in the same manner as described above but without using isocyanate, and the isocyanate equivalent per 100 g of the solution is calculated as follows:

Isocyanate Equivalent/100 g Solution $$= \frac{(\text{Blank Test Value} - \text{Titrated Value}) \times (\text{Normality of HCl})}{1000 \times \text{weight of Isocyanate Sample}} \times 100$$

When 82.1 g (0.24 mole) of 4,4'-diphenylmethanebis(methyl iminoacetate) was further added to the solution of the blocked compound of the imide group containing diisocyanate thus formed and the reaction was conducted for about 1 hour at 165° to 170°C, a solution of a prepolymer terminally substituted with glycine derivatives, with a non-volatiles content of 43.5% by weight (after drying for 2 hours at 200°C) and a solution viscosity of 5,800 cp. (30°C), was obtained.

EXAMPLE B

In the same flask as described in Example A were placed 151.2 g (0.6 mole) of 4,4'-diphenylether diisocyanate and 416.4 g of commercially available cresol and then the temperature of the mixture was increased. Thereafter, the mixture was stirred for about 1 hour at 160°C and then after adding to the mixture 126.4 g (0.54 mole) of BTC, the reaction was carried out at 155° to 160°C. After the addition of BTC, the reaction was continued for about 7 hours and then after 44.7 g (0.12 mole) of 4,4'-diphenylmethanebis (ethyl iminoacetate) was added to the blocked compound of the imide group containing diisocyanate prepolymer thus obtained, the reaction was further conducted for about 1 hour at 165° to 170°C. Thus, a solution of a prepolymer terminally substituted with glycine derivatives having a non-volatiles content of 46.7% by weight (after drying for 2 hours at 200°C) and a solution viscosity of 72,800 cp. (30°C) was obtained. It was confirmed that the solution contained 0.0172 equivalents of the glycine derivative terminal groups per 100 g of the solution.

EXAMPLE C

In the same flask as described in Example A were placed 150.1 g (0.6 mole) of 4,4'-diphenylmethanediisocyanate and 453.9 g of commercially available cresol and the temperature of the mixture was increased. After stirring the mixture for about 1 hour at 160°C, 94.3 g (0.36 mole) of 1,2,3,4-butanetetracarboxylic acid dimethyl ester was added to the mixture and then the reaction was conducted for about 4 hours at 155° to 160°C. Then, to the blocked compound of the imide group-containing diisocyanate obtained in the above described reaction was further added 75.4 g (0.24 mole) of 4,4'-diphenylmethanebis-(iminoacetic acid) and then the reaction was further conducted for about 1 hour at 165° to 170°C. Thus, a solution of a prepolymer terminally substituted with glycine derivatives having a non-volatiles content of 38.3% by weight (after drying for 2 hours at 200°C) and a solution viscosity of 1,900 cp. (30°C) was obtained. The solution was confirmed to contain 0.0685 equivalents of the glycine derivative terminal groups per 100 g of the solution.

EXAMPLE D

In the same flask as described in Example A were placed 200 g (0.8 mole) of 4,4'-diphenylmethanediisocyanate, 122.9 g (0.64 mole) of trimellitic acid anhydride, 80 g of N-methyl-2-pyrrolidone, and 60.8 g of xylene and the mixture was heated with stirring, whereby the mixture became a homogeneous solution at about 70°C. When the temperature of the reaction system was further increased to 100°C, the reaction proceeded generating carbon dioxide vigorously. When the reaction system was further heated at this temperature, the color of the solution became black-brown after 2 hours and then the isocyanate content of the reaction system reached almost the theoretical equivalent after 4 hours and 30 minutes, when 546.4 g of commercially available cresol was added to the reaction system and the mixture was stirred for 1 hour at 150° to 160° C to block the isocyanate group with cresol. Thus, a solution of the blocked compound of a diisocyanate prepolymer containing imide-amide groups having a non-volatiles content of 30.4% by weight (after drying for 2 hours at 200°C) and a solution viscosity of 2,150 cp. (30°C) was obtained. The solution was confirmed to contain 0.0355 equivalents of isocyanate group per 100 g of the solution.

EXAMPLE E

In the same flask as described in Example A were placed 200 g (0.8 mole) of 4,4'-diphenylmethanediisocyanate and 392 g of commercially available cresol and the former was dissolved at 35°–45°C. To the solution was added 191.6 g (0.56 mole) of 4,4'-diphenylmethanebis(methyl iminoacetate), the reaction was continued for 30 minutes at 50°C, and then the temperature of the reaction system was increased, whereby elimination of methanol began at about 150°C. While removing the methanol formed from the reaction system, the temperature of the system was further increased and the reaction was further conducted for 3 hours at about 200°C. Then, by adding to the reaction system 142.4 g of commercially available cresol followed by cooling, a solution of the blocked compound of a diisocyanate containing hydantoin rings with 0.0530 equivalents of isocyanate groups remaining per 100 g of the solution was obtained. The solution obtained was confirmed to have a non-volatiles content of 39.7% by weight (after drying for 2 hours at 200°C) and a solution viscosity of 8,750 cp. (30°C).

Specific examples of preparing the solution of this invention for forming thermally resistant polymers are shown below:

EXAMPLE 1

A mixture of 400 g of the solution of the prepolymer terminally substituted with glycine derivatives prepared in Example A, 360 g of the solution of the blocked compound of the imide group-containing diisocyanate which was the precursor of the diisocyanate terminally substituted with glycine derivatives in Example A, and 100 g of commercially available cresol was mixed well with stirring to provide the solution of this invention for forming a thermally resistant polymer. This solution had a non-volatiles content of 35.8% by weight (after drying for 2 hours at 200°C) and a solution viscosity of 1,540 cp. (30°C). When the solution thus prepared was stored for 6 months at 30°C, substantially no changes in the properties of the solution, such as viscosity and color were observed.

The properties of an enameled electric wire obtained by coating and baking this solution onto an annealed copper wire having a diameter of 2.0 mm at a rate of 6.0 meters/min. and at tower temperatures of 420°C using dies in a vertical research tower of a length of 3 meters are shown in Table 1.

Example 2

A mixture of 400 g of the solution of the prepolymer terminally substituted with glycine derivatives prepared in Example B and 375 g of the solution of the blocked compound of the imide group containing diisocyanate which was the precursor of the prepolymer terminally substituted with glycine derivatives of Example B was mixed well with stirring to provide the solution of this invention for forming thermally resistant polymers. The solution had a non-volatiles content of 43.3% by weight (after drying for 2 hours at 200°C) and a viscosity of 52,500 cp. (30°C). When the solution was stored for 6 months at 30°C, almost no changes in the properties of the solution were observed.

The solution prepared above was cast on a glass plate, dried and hardened under the conditions of 180°C for 30 minutes and 250°C for 30 minutes, and the film formed was stripped from the glass plate, whereby a flexible film was obtained. The properties of the film thus obtained are shown below:

| | |
|---|---|
| Film Thickness | 50 microns |
| Tear Strength* | 350 g/mil |
| Tensile Strength** | 12.5 kg/mm$^2$ |
| Elongation** | 25% |
| Volume Resistivity | $10^{16}<$ |
| Dielectric Constant | 3.3 |
| Dielectric Loss Tangent | 0.025 |

*measured according to ASTM D1004-61T
**measured according to ASTM D882-61T

EXAMPLE 3

A mixture of 400 g of the solution of the prepolymer terminally substituted with glycine derivatives prepared in Example A, 360 g of the solution of the blocked compound of the diisocyanate prepolymer containing imide-amide groups prepared in Example D, and 100 g of commercially available cresol was stirred well to provide the solution of this invention for forming thermally resistant polymers. The solution had a non-volatiles content of 32.4% by weight (after drying for 2 hours at 200°C) and a solution viscosity of 3,340 cp. (30°C).

When the solution prepared above was cast on a glass plate in a thickness of 50 microns and dried and hardened under the conditions of 180°C for 30 minutes and 250°C for 30 minutes, a tough and flat film having good abrasion resistance was obtained.

Also, the properties of the enameled electric wire obtained by coating and baking the above solution on an annealed copper wire having a diameter of 1.00 mm using dies at a rate of 6.0 meters/min and a tower temperature of 430°C in a vertical research tower of a length of 3 meters are shown in Table 1.

EXAMPLE 4

A mixture of 400 g of the solution of the prepolymer terminally substituted with glycine derivative prepared in Example A, and 240 g of the solution of the blocked compound of the hydantoin ring-containing diisocyanate prepared in Example E and 90 g of commercially available cresol were mixed well with stirring to provide the solution of this invention for forming thermally resistant polymers, the solution had a non-volatiles content of 35.6% by weight (after drying for 2 hours at 200°C) and a solution viscosity of 2,700 cp. (30°C).

The properties of the enameled electric wire obtained by coating and baking the solution prepared above on annealed copper wire having a diameter of 1.00 mm using dies at a rate of 6.5 meters/min and at a tower temperature of 420°C in a vertical research tower of a length of 3 meters are shown in Table 1.

EXAMPLE 5

A mixture of 800 g of the solution of the prepolymer terminally substituted with glycine derivatives prepared in Example A and a solution of 76 g of "Desmodur CT-Stable" (trade name, produced by Farbenfabriken Bayer Aktiengesellshaft) dissolved in 225 g of a commercial cresol was stirred well to provide the solution of this invention for forming thermally resistant polymers. The solution had a non-volatiles content of 35.4% by weight (after drying for 2 hours at 200°C) and a solution viscosity of 1,420 cp. (30°C).

A plane woven glass fiber cloth having a thickness of 0.18 mm was impregnated with the solution prepared above at a resin content level of 50% by weight based on the weight of the cloth and the impregnated cloth was dried for 30 minutes at 180°C to remove the solvent. In the same way, 12 sheets of the prepreg were prepared.

Then, the 12 sheets of the prepregs thus prepared were piled, heated between a press machine heated to 350°C for 10 minutes under a low pressure and then pressed for 10 minutes at a pressure of 150 kg/cm². The bending strength of the laminate thus obtained was 43–48 Kg/mm² at room temperature and 41 Kg/mm² at 200°C, the water absorption factor thereof was 1.2%, and the heating loss of the laminate after storing for 10 days at 250°C was lower than 1.0% by weight.

EXAMPLE 6

To 800 g of the solution of the prepolymer terminally substituted with glycine derivatives prepared in Example A were added 58 g of the cresol-blocked compound of 4,4'-diphenylmethane diisocyanate, 220 g of commercially available cresol, and 0.7 g of zinc octylate and they were stirred at 60°C to provide the solution of this invention for forming thermally resistant polymers. The solution had a non-volatiles content of 34.8% by weight (after drying for 2 hours at 200°C) and a solution viscosity of 630 cp. (30°C).

The properties of the enameled electric wire obtained by coating and baking on an annealed copper wire having a diameter of 1.00 mm using dies under the same conditions as described in Example 1 are shown in Table 1.

EXAMPLE 7

A mixture of 400 g of the solution of the prepolymer terminally substituted with glycine derivatives prepared in Example B and 194 g of the solution of the blocked compound of the diisocyanate prepolymer containing an imide-amide groups prepared in Example D was mixed well to provide the solution of this invention for forming thermally resistant polymers. The solution had a non-volatiles content of 42.3% by weight (after drying for 2 hours at 200°C) and a solution viscosity of 36,400 cp. (30°C).

When the solution prepared above was cast on a glass plate in a thickness of 50 microns and dried and hardened under the conditions of 180°C for 30 minutes and 250°C for 30 minutes, a tough and soft film was obtained.

Furthermore, by diluting the solution with a mixture of commercially available cresol and high boiling naphtha, a solution for coating an enameled electric wire having a non-volatiles content of 34.3% by weight (after drying for 2 hours at 200°C) and a solution viscosity of 5,300 cp. (30°C) was obtained. When the above solution was coated and baked on an annealed copper wire having a diameter of 1.00 mm using dies under the same conditions as described in Example 1, the enameled electric wire having the properties as shown in Table 1 was obtained.

EXAMPLE 8

A mixture of 800 g of the solution of the prepolymer terminally substituted with glycine derivatives prepared in Example C and 190 g of "Desmodur AP-Stable" (trade name, produced by Farbenfabriken Bayer Aktiengesellshaft) was stirred well to provide the solution of this invention for forming thermally resistant polymers. The solution had a non-volatiles content of 48.8% by weight (after drying for 2 hours at 200°C) and a solution viscosity of 3,200 cp. (30°C). The properties of the enameled electric wire obtained by coating and baking the solution on an annealed copper wire having a diameter of 1.00 mm using dies at a rate of 6.5 meters/min and at a temperature of 420°C are shown in Table 1.

Table 1

| | | Example 1 | Example 3 | Example 4 | Example 6 | Example 7 | Example 8 |
|---|---|---|---|---|---|---|---|
| Structure of Wire | Bare wire diameter (mm) | 1.000 | 1.000 | 1.000 | 1.000 | 1.000 | 1.000 |
| | Overall diameter (mm) | 1.082 | 1.081 | 1.082 | 1.080 | 1.080 | 1.081 |
| | Film thickness (mm) | 0.041 | 0.0405 | 0.041 | 0.040 | 0.040 | 0.0405 |
| Appearance of Wire | Naked eye evaluation | Good | Good | Good | Good | Good | Good |
| Flexibility | Ordinary state | 1d | 1d | 1d | 1d | 1d | 1d |
| | 5% pre-elongation | 1d | 1d | 1d | 1d | 1d | 1d |
| | 10% do. | 1d | 1d | 1d | 1d | 1d | 1d |
| | 15% do. | 1d | 1d | 1d | 2d | 1d | 2d |
| | 20% do. | 2d | 2d | 2d | 3d | 1d | 4d |
| | After heat aging (200°C × 24 hrs.) | 2d | 1d | 2d | 3d | 1d | 3d |
| Abrasion Resistance | Reciprocating, 600 g.wt. (times) | 217 | 303 | 223 | 129 | 321 | 197 |

Table 1—Continued

|  |  | Example 1 | Example 3 | Example 4 | Example 6 | Example 7 | Example 8 |
|---|---|---|---|---|---|---|---|
| Twist Resistance | Undirectional scrapes 20cm length (times) | 2,743<br>82 | 2,691<br>85 | 2,615<br>81 | 2,565<br>77 | 2,673<br>87 | 2,483<br>76 |
| Heat Shock Resistance | 200°C × 2 hrs.<br>240°C × 2 hrs.<br>260°C × 2 hrs. | 1d<br>1d<br>1d | 1d<br>1d<br>1d | 1d<br>1d<br>1d | 1d<br>1d<br>2d | 1d<br>1d<br>1d | 1d<br>2d<br>3d |
| Brake-down Voltage | Ordinary state (KV)<br>After heat aging 260°C × 168 hrs. (KV) | 12.5<br>10.8 | 12.8<br>11.9 | 12.4<br>11.1 | 11.3<br>9.9 | 13.3<br>12.9 | 11.5<br>9.6 |
| Pinholes in Water | 3% pre-elongation | non | non | non | non | non | non |
| Cut-through Temp. | 2.1 kg.wt., 2°C/min (°C) | 465 | 468 | 455 | 443 | 463 | 445 |
| Chemical Resistance (pencil hardness | 3% NaOH (20°C × 24 hrs)<br>5% NaOH (20°C × 24 hrs)<br>10% NaOH (20°C × 24 hrs) | 7H<br>6H<br>6H | 7H<br>7H<br>6H | 7H<br>7H<br>6H | 7H<br>6H<br>5H | 7H<br>7H<br>6H | 7H<br>6H<br>4H |
| Blister Test | Blister condition | pre-elongation |  |  |  |  |  |  |
| R-22-oil (1 : 1) | 120°C × 30 mins. | 0%<br>5%<br>10% | ◉<br>◉<br>◉ | ◉<br>◉<br>◉ | ◉<br>○<br>△ | ◉<br>○<br>△ | ◉<br>◉<br>◉ | ◉<br>○<br>△ |
| 70°C × 168 hrs. | 160°C × 30 mins. | 0%<br>5%<br>10% | ◉<br>◉<br>◉ | ◉<br>◉<br>◉ | ○<br>○<br>△ | ○<br>○<br>△ | ◉<br>◉<br>◉ | ○<br>○<br>△ |

(Note 1) The mark (d) in Table 1 shows wire diameter. For example, 2d indicates double wire diameter and means that the test sample can be wound in a double wire diameter without faults.
(Note 2) The blister resistance test in Table 1 was conducted by stretching the sample wire heat-treated for 15 minutes at 150°C to 0%, 5% or 10%, treating the sample in R-22-oil (1 : 1) for 168 hours at 70°C using an autoclave, treating the sample in a dryer for 30 minutes at 120°C and for 30 minutes at 160°C, and then observing the state of the formation of blisters of the sample.

In addition, the mark ◉ in Table 1 stands for the case where no foams were observed; the mark ○ stands for the case where foams were hardly observed, and the mark △ stands for the case where foams were observed by the naked eye.

While the invention has been described in detail and with reference to specific embodiments thereof, it will be apparent to one skilled in the art that various changes and modifications can be made therein without departing from the spirit and scope thereof.

What is claimed is:

1. A solution for forming thermally resistant polymers comprising a mixture of a polymer terminally substituted with glycine derivatives and a blocked polyisocyanate in an amount approximately stoichiometrically equivalent to said prepolymer in an inert solvent, said prepolymer comprising the reaction product of two equivalents of a diglycine derivative having the general formula

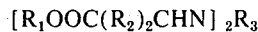

[R₁OOC(R₂)₂CHN] ₂R₃ wherein $R_1$ and $R_2$, which may be the same or different, each represents a hydrogen atom or a lower alkyl radical and $R_3$ represents a divalent aromatic radical, a divalent aliphatic radical or a divalent alicyclic radical, with a diisocyanate or a blocked diisocyanate, said diisocyanate or blocked diisocyanate containing an imide group and, optionally an imide-forming group in the molecular chain of the molecule, and comprising the reaction product of at least one of 1,2,3,4-butanetetracarboxylic acid and derivatives thereof selected from the group consisting of 1,2,3,4-butanetetracarboxylic acid mono anhydride, 1,2,3,4-butanetetracarboxylic acid diester and 1,2,3,4-butanetetracarboxylic acid diamide, with an excess molar amount of a diisocyanate monomer or a blocked monomer thereof.

2. The solution of claim 1, wherein said diisocyanate monomer is an aliphatic diisocyanate monomer, alicyclic diisocyanate monomer, an aromatic diisocyanate, or thiodiisocyanate, and said blocked monomer is a blocked compound of said diisocyanate monomer.

3. The solution of claim 2, wherein said diisocyanate monomer is p-phenylenediisocyanate, m-phenylenediisocyanate, 4,4'-diphenylether diisocyanate, 4,4'-diphenylmethanediisocyanate, 1,5-naphthylenediisocyanate, cyclohexane-1,4-diisocyanate or hexamethylenediisocyanate, and wherein said blocked monomer is bis(phenoxycarbamyl)-4,4'-diphenylmethane, bis(phenoxycarbamyl)-4,4'-diphenyl ether, bis(phenoxycarbamyl)-1,3-benzene, bis(phenoxycarbamyl)-2,4-toluene, or bis(ethoxycarbamyl)-4,4'-diphenyl ether.

4. The solution of claim 1, wherein said diglycine derivative is p-phenylenebis(iminoacetic acid), m-phenylenebis(iminoacetic acid), 4,4'-diphenylbis(iminoacetic acid), 4,4'-diphenyletherbis(iminoacetic acid), 4,4'-diphenylmethanebis(iminoacetic acid), 4,4'-benzophenonebis(iminoacetic acid), 4,4'-diphenylsulfonebis(iminoacetic acid), hexamethylenebis(iminoacetic acid), 1,3-cyclohexanebis(iminoacetic acid), the lower alkyl esters thereof, or the isomers of thereof.

5. The solution of claim 1, wherein the amount of said diisocyanate monomer, or blocked monomer thereof, the amount of said 1,2,3,4-butane tetracarboxylic acid or derivative thereof, and the amount of said diglycine derivative, all on a molar basis, satifies the following relationships 1. the ratio of the amount of said 1,2,3,4-butane tetracarboxylic acid or derivative thereof to the amount of said diisocyanate monomer or blocked monomer thereof ranges from 0.5 to 0.95; and
2. the amount of said diglycine derivative is equal to about two times the total of the amount of said diisocyanate monomer or blocked monomer thereof minus the amount of said 1,2,3,4-butanetetracarboxylic acid or derivative thereof.

6. The solution of claim 1, wherein said solution comprises said prepolymer terminally substituted with glycine derivatives and said blocked polyisocyanate at a concentration of about 20 to 90% by weight.

7. The solution of claim 1, wherein said blocked polyisocyanate comprises a polyisocyanate containing at least one of an imide group, a hydantoin ring, and an amide group in the molecular chain.

8. The solution of claim 7, wherein said polyisocyanate containing an imide group comprises the reaction product of an excess molar amount of a diisocyanate monomer or a blocked monomer thereof and 1,2,3,4-butanetetracarboxylic acid or derivative thereof.

9. The solution of claim 7, wherein said blocked polyisocyanate compound containing a hydantoin ring comprises the reaction product of an excess molar amount of a diisocyanate monomer or a blocked monomer thereof with a diglycine derivative having the formula $$[R_1OOC(R_2)_2CHN]_2R_3$$

wherein $R_1$ and $R_2$, which may be the same or different, each represents a hydrogen atom or a lower alkyl radical, and $R_3$ represents a divalent aliphatic organic radical, a divalent aromatic organic radical, or a divalent alicyclic organic radical.

10. The solution of claim 7, wherein said blocked polyisocyanate compound comprises the reaction product of an excess molar amount of a diisocyanate monomer and a tribasic organic acid anhydride having the general formula

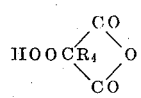

wherein $R_4$ represents a trivalent aliphatic organic radical, a trivalent aromatic organic radical, or a trivalent alicyclic organic radical.

11. The solution of claim 1, wherein said solution has a viscosity ranging from about 200 to about 150,000 centipoises.

12. The solution of claim 1, wherein said solution additionally contains a polymerization promotor.

* * * * *